Patented June 17, 1924.

1,498,417

UNITED STATES PATENT OFFICE.

ARTHUR ZITSCHER AND AUGUST LEOPOLD LASKA, OF OFFENBACH-ON-THE-MAIN, GERMANY, ASSIGNORS TO CHEMISCHE FABRIK GRIESHEIM-ELEKTRON, OF FRANK-FORT-ON-THE-MAIN, GERMANY.

AZO DYESTUFFS INSOLUBLE IN WATER AND PROCESS OF MAKING SAME.

No Drawing.   Application filed July 3, 1923.   Serial No. 649,368.

*To all whom it may concern:*

Be it known that we, ARTHUR ZITSCHER and AUGUST LEOPOLD LASKA, both citizens of the German Republic, and residents of Offenbach-on-the-Main, Germany, have invented certain new and useful Improvements in Azo Dyestuffs Insoluble in Water and Processes of Making Same, of which the following is a specification.

Our invention relates to new dyestuffs having probably the general formula:

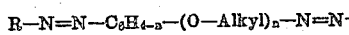
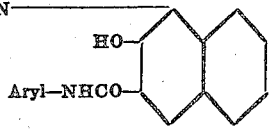

wherein R means a not sulfonated arylresidue not containing an auxochromic group, $n$ a number being at least 1. The dyestuffs can be obtained by combining a diazotized not sulfonated aminoazobody, derived from diazocompounds not containing an auxochromic group and aminoderivatives of mono- or polyvalent phenolalkylethers, with an arylid of 2.3-oxynaphthoic acid. The dyestuffs are when dry maroon to black powders, insoluble in water, soluble in sulfuric acid to a bluish green to violet solution, yielding upon reduction with stannous chloride an arylamine, a derivative of diaminobenzene containing at least one O-alkyl group and an arylid of the 1-amino-2-oxy-3-naphthoic acid. The new dyestuffs may be used for the manufacture of valuable pigments adapted for the production of glue-water colors and give, when produced on the fiber, maroon to black shades of an excellent fastness to washing and chlorine.

As aminoazocompounds we may use all those, which are obtained by combining not sulfonated diazocompounds not containing an auxochromic group such as of anilin, its homologues and substitution products, such as toluidin, xylidin, anisidin, cresidin, chloro- and nitroanilins, chloro- and nitrotoluidins, chloro- and nitroxylidins, cholo- and nitroanisidins, chloro- and nitrocresidins, α- and β-naphthylamin or their derivatives such as aminonaphtholether, aminomethylnaphthalene, chloro- or nitronaphthylamins and others, with for instance an aminocresolalkylether, acetylaminoanisidin or aminohydroquinonedialkylether.

As azocomponents we may use all the arylids of 2.3-oxynapthoic acid, such as the anilid, toluidids, anisidids, phenetidids, α- and β-naphthalids, 2.3-oxynaphthoylaminothiazol. -meta-toluylene- and -para-phenylendiamin, arylids, chloro- or nitrosubstituted, and the like.

The following examples illustrate the invention, the parts being by weight:

Example 1.

A diazosolution, prepared with 30,7 parts of the aminoazobody, derived from diazotized α-naphthylamin and aminohydroquinonedimethylether, is combined with a solution of 27,6 parts of the anilid of 2.3-oxynaphthoic acid in dilute caustic soda lye, with the addition of an excess of sodium acetate and Turkey red oil. The separated dyestuff is filtered and washed. For the production of color lakes it may be used advantageously in form of a paste. The lakes, prepared therefrom in the usual manner, give darkly bluish black glue-water-colors of a very good fastness.

Production of the dyestuffs on the fiber.

Example 2.

The yarn, having been well boiled and dried, is impregnated with a solution of 10 gr. of α-naphthalid of 2.3-oxynaphthoic acid,
15 c. c. of caustic soda lye of 34° Bé. and
20 c. c. of Turkey red oil in the liter, well wrung out and without being dried developed in a diazosolution, containing sodium acetate and 6 gr. of the aminoazobody, derived from diazotized α-naphthylamin and para-cresidin or aminohydroquinonedimethylether or derived from β-naphthylamin and aminohydroquinonedimethylether in the liter.

In this manner we obtain reddish black tints with the aminoazobody, derived from diazotized α-naphthylamin and para-cresidin, bluish black tints with the body derived from diazotized α- and β-naphthylamin and aminohydroquinonedimethylether, all tints being of a very good fastness,

Example 3.

The yarn, having been well boiled and dried, is impregnated with a solution of:

10 gr. of α-naphthalid of 2.3-oxynapthoic acid,
15 c. c. of caustic soda lye of 34° Bé. and
20 c. c. of Turkey red oil in the liter, well wrung out and without being dried developed in a diazosolution, containing sodium acetate and 6,6 gr. of the aminoazobody from diazotized ortho-phenetidin and aminohydroquinonediethylether in the liter, well rinsed and soaped.

In this manner we obtain bluish black tints of a very good fastness.

The fastness to light of the colored fabrics can be increased by an after treatment with copper salts.

With other corresponding aminoazocompounds and other arylides of 2.3-oxynapthoic acid the process may be conducted similarly.

The following table gives the shades of a number of dyestuffs, prepared according to the present process:

| Diazo compound of the aminoazo compound from— | Combined with the arylid of 2.3-oxy-naphthoic acid. | Shade. | Diazo compound of the aminoazo compound from— | Combined with the arylid of 2.3-oxy-naphthoic acid. | Shade. |
|---|---|---|---|---|---|
| Anilin + 2-aminohydroquinone-1-methyl-4-benzylether. | Anilid | Reddish black. | m-Toluidin + aminohydroquinone-diethylether. | α-naphthalid. | Violet-black. |
| Meta-toluidin + aminohydroquinonediethylether. | ...do... | Reddish black. | Ortho-phenetidin+aminohydroquinone-dimethylether. | ...do... | Bluish black. |
| Ortho-phenetidin + aminohydroquinone-dimethylether. | ...do... | Violet-black. | Ortho-phenetidin+aminohydroquinone-diethylether. | ...do. (Example 3). | Bluish black. |
| Ortho-phenetidin + aminohydroquinone-diethylether. | ...do... | Bluish black. | Ortho-phenetidin + 2-aminohydroquinone-1-methyl-4-benzylether. | ...do... | Black. |
| Ortho-phenetidin + 2-aminohydroquinone-1-methyl-4-benzylether. | ...do... | Violet-black. | 3-Amino-1.4-cresolethylether + aminohydroquinonedimethylether. | ...do... | Bluish black. |
| 3-Amino-1.4-cresolethylether + aminohydroquinone-dimethylether. | ...do... | Violet-black. | 3-Amino-1.4-cresolethylether + aminohydroquinonediethylether. | ...do... | Black. |
| 3-Amino-1.4-cresolethylether + aminohydroquinone-diethylether. | ...do... | Black. | Aminohydroquinonedimethylether+aminohydroquinonedimethylether. | ...do... | Bluish black. |
| Aminohydroquinonedimethylether + aminohydroquinonedimethylether. | ...do... | Bluish black. | Meta-nitroanilin + aminohydroquinone-dimethylether. | ...do... | Bluish black. |
| 4-Nitro-1.2-toluidin + aminohydroquinonedimethylether. | ...do... | Violet-black. | 3-Nitro-1.2-toluidin + aminohydroquinonediethylether. | ...do... | Bluish black. |
| 3-Nitro-1.2-toluidin + aminohydroquinonediethylether. | ...do... | Bluish black. | 5-Nitro-1.2-toluidin + aminohydroquinonediethylether. | ...do... | Bluish black. |
| 5-Nitro-1.2-toluidin + aminohydroquinonediethylether. | ...do... | Bluish black. | 5-Nitro-para-xylidin + aminohydroquinonedimethylether. | ...do... | Black. |
| 5-Nitro-2-aminohydroquinonedimethylether + aminohydroquinonedimethylether. | ...do... | Bluish black. | 4-Nitro-1.2-phenetidin + aminohydroquinonedimethylether. | ...do... | Bluish black. |
| 5-Nitro-2-aminohydroquinonedimethylether + para-cresidin. | ...do... | Violet-black. | 3-Amino-6-nitro-1.4-cresolmethylether + aminohydroquinonedimethylether. | ...do... | Bluish black. |
| 4-Nitro-1-naphthylamin + para-cresidin. | Ortho-toluidid. | Bluish black. | 5-Nitro-2-aminohydroquinonedimethylether + aminohydroquinonedimethylether. | ...do... | Bluish black. |
| Meta-nitroanilin + aminohydroquinone-dimethylether. | Ortho-anisidid. | Bluish black. | α-Naphthylamin + aminohydroquinone-dimethylether. | ...do. (Example 2). | Bluish black. |
| 3-Nitro-1.2-toluidin + aminohydroquinonediethylether. | ...do... | Violet-black. | β-Naphthylamin + aminohydroquinone-dimethylether. | ...do. (Example 2). | Bluish black. |
| 4-Nitro-1.2-toluidin + aminohydroquinonediethylether. | ...do... | Bluish black. | 4-Aminobenzyldimethylamin+para-cresidin. | β-Naphthalid. | Bluish maroon. |
| 5-Nitro-para-xylidin + aminohydroquinonedimethylether. | ...do... | Black. | 2.1-Nitroanilin + para-cresidin. | ...do... | Dark maroon. |
| 5-Nitro-para-xylidin + aminohydroquinonedimethylether. | Ortho-phenetidid. | Black. | | | |
| 5-Nitro-para-xylidin + aminohydroquinonedimethylether. | Para-phenetidid. | Black. | 4-Nitro-1.2-anisidin + para-cresidin. | ...do... | Violet-black. |
| Anilin+2-aminohydroquinone-1-methyl-4-benzylether. | Para-anisidid. | Violet-black. | α-Naphthylamin + 4-acetylamino-2-anisidin. | ...do... | Black. |
| Ortho-phenetidin + aminohydroquinone-dimethylether. | ...do... | Violet-black. | Ortho-phenetidin + aminohydroquinone-dimethylether. | ...do... | Violet-black. |
| 3-Amino-1.4-cresolethylether+aminohydroquinonedimethylether. | ...do... | Violet-black. | Ortho-phenetidin + aminohydroquinone-diethylether. | ...do... | Bluish black. |
| Aminohydroquinonedimethylether + aminohydroquinonedimethylether. | ...do... | Violet-black. | 3-Amino-1.4-cresolethylether + aminohydroquinonedimethylether. | ...do... | Bluish black. |
| 4-Nitro-1.2-toluidin + aminohydroquinonedimethylether. | ...do... | Violet-black. | Aminohydroquinonedimethylether + aminohydroquinonedimethylether. | ...do... | Bluish black. |
| 3-Nitro-1.2-toluidin + aminohydroquinonediethylether. | ...do... | Violet-black. | 3-Nitro-1.2-toluidin + aminohydroquinonediethylether. | ...do... | Bluish black. |
| 5-Nitro-2-aminohydroquinonedimethylether + aminohydroquinonedimethylether. | ...do... | Violet-black. | 5-Nitro-1.2-toluidin + aminohydroquinonediethylether. | ...do... | Violet-black. |
| 5-Nitro-para-xylidin + aminohydroquinonedimethylether. | ...do... | Black. | 5-Nitro-p-xylidin + aminohydroquinone-dimethylether. | ...do... | Black. |
| Para-cresidin+para-cresidin. | α-naphthalid. | Dark maroon. | 4-Nitro-1.2-phenetidin + aminohydroquinonedimethylether. | ...do... | Violet-black. |
| Ortho-aminothiophenolmethylether + para-cresidin. | ...do... | Very dark maroon. | 3-Amino-6-nitro-1.4-cresolmethylether + aminohydroquinonedimethylether. | ...do... | Violet-black. |
| 5-Nitro-1.2-toluidin+para-cresidin. | ...do... | Bluish black. | 5-Nitro-2-aminohydroquinonedimethylether + aminohydroquinonedimethylether. | ...do... | Bluish black. |
| 6-Nitro-para-cresidin+para-cresidin. | ...do... | Black. | m-Nitroanilin + aminohydroquinonedimethylether. | meta-nitroanilid. | Reddish black. |
| α-Naphthylamin+para-cresidin. | ...do. (Example 2). | Reddish black. | Para-nitroanilin + aminohydroquinone-dimethylether. | ...do... | Bluish black. |
| 6-Nitro-para-cresidin+4-acetylamino-2-anisidin. | ...do... | Violet-black. | 4-Nitro-1.2-toluidin + aminohydroquinonedimethylether. | ...do... | Violet-black. |
| 5-Nitro-2-aminohydroquinonedimethylether+4-acetylamino-2-anisidin. | ...do... | Black. | 3-Nitro-1.2-toluidin + aminohydroquinonediethylether. | ...do... | Bluish black. |
| Anilin+2-aminohydroquinone-1-methyl-4-benzylether. | ...do... | Violet-black. | | | |

Now what we claim and desire to secure by Letters Patent, is the following:

1. As new articles the azodyestuffs, insoluble in water, having probably the general formula:

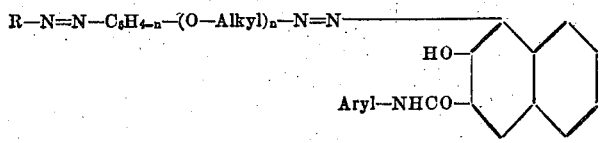

wherein R means a not sulfonated arylresidue not containing an auxochromic group, n a number being at least 1, said dyestuff being, when dry, maroon to black powders, insoluble in water, soluble in sulfuric acid to a bluish green to violet solution, yielding upon reduction with stannous chloride an arylamin, a derivative of diamino-benzene containing at least one O-alkylgroup and an arylid of 1-amino-2-oxy-3-naphthoic acid, said dyestuffs being useful for the production of valuable pigment colors and giving, when produced on the fiber, maroon to black shades of an excellent fastness to washing and chlorine.

2. A process of making azodyestuffs insoluble in water, consisting in combining diazotized not sulfonated aminoazobodies from diazocompounds not containing an auxochromic group and aminoderivatives of n-valent phenolalkylethers, n meaning a number, being at least 1, with arylides of 2.3-oxynaphthoic acid.

3. Textile materials dyed with one of the dyestuffs covered by claim 1, said dyestuff being developed on the material.

4. As new articles the azodyestuffs, insoluble in water, having probably the general formula:

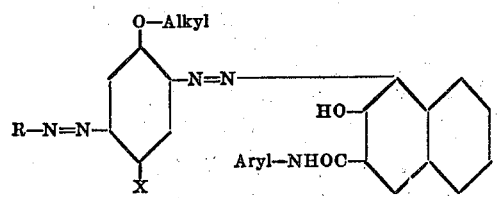

wherein R means a not sulfonated arylresidue not containing an auxochromic group, X a monovalent atom or group except H, said dyestuffs being, when dry, maroon to black powders, insoluble in water, soluble in sulfuric acid to a bluish green to violet solution, yielding upon reduction with stannous chloride an arylamin, a derivative of para-diaminobenzene, containing an O-alkylgroup in ortho-position to the one aminogroup, a monovalent atom or group in ortho-position to the other aminogroup, and an arylid of 1-amino-2-oxy-3-naphthoic acid, said dyestuffs being useful for the production of valuable pigment colors and giving, when produced on the fiber, maroon to black shades of an excellent fastness to washing and chlorine.

5. A process of making azodyestuffs, insoluble in water, consisting in combining diazotized not sulfonated aminoazobodies from diazocompounds not containing an auxochromic group and bodies of the general formula:

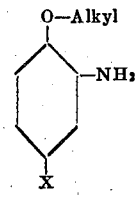

X meaning a monovalent atom or group except H, with arylids of 2.3-oxynaphthoic acid.

6. Textile materials dyed with one of the dyestuffs covered by claim 4, said dyestuff being developed on the material.

7. As new articles the azodyestuffs, insoluble in water, having probably the general formula:

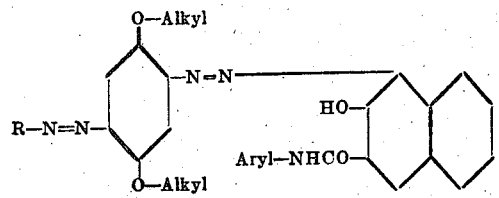

wherein R means a not sulfonated arylresidue, not containing an auxochromic group, said dyestuffs being, when dry, black powders, insoluble in water, soluble in sulfuric acid to a bluish green to violet solution, yielding upon reduction with stannous chloride an arylamin, a 2.5-diaminohydroquinonedialkylether and an arylid of 1- amino-2-oxy-3-naphthoic acid, said dyestuffs being useful for the production of valuable pigment colors and giving, when produced on the fiber, black shades of an excellent fastness to washing and chlorine.

8. A process of making azodyestuffs, insoluble in water, consisting in combining diazotized not sulfonated aminoazobodies from diazocompounds not containing an auxochromic group and aminohydroquinonedialkylether, with arylids of 2.3 oxynaphthoic acid.

9. Textile materials dyed with one of the dyestuffs covered by claim 7, said dyestuff being developed on the material.

In testimony, that we claim the foregoing as our invention, we have signed our names, this 14th day of June, 1923.

AUGUST LEOPOLD LASKA. [L. S.]
ARTHUR ZITSCHER. [L. S.]

Witnesses:
PETER LAUTENSCHLÄGER,
FRIEDRICH DÉSOR.